(12) United States Patent
Weinberg et al.

(10) Patent No.: US 10,137,504 B2
(45) Date of Patent: Nov. 27, 2018

(54) PIPE END MACHINING DEVICE WITH AXIAL AUTOFEED

(71) Applicant: ILLINOIS TOOL WORKS INC., Glenview, IL (US)

(72) Inventors: Jeremy E. Weinberg, Oak Park, IL (US); Mark Wozniak, Cary, IL (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 334 days.

(21) Appl. No.: 14/803,176

(22) Filed: Jul. 20, 2015

(65) Prior Publication Data
US 2015/0321259 A1 Nov. 12, 2015

Related U.S. Application Data

(63) Continuation of application No. 12/574,775, filed on Oct. 7, 2009, now Pat. No. 9,114,458.

(60) Provisional application No. 61/235,768, filed on Aug. 21, 2009.

(51) Int. Cl.
*B23B 5/16* (2006.01)

(52) U.S. Cl.
CPC .............. *B23B 5/162* (2013.01); *B23B 5/168* (2013.01); *B23B 2260/004* (2013.01); *B23B 2260/104* (2013.01); *Y10T 82/22* (2015.01)

(58) Field of Classification Search
CPC ... B23B 2260/004; B23B 5/162; B23B 5/168; B23B 2260/104
See application file for complete search history.

(56) References Cited

U.S. PATENT DOCUMENTS

| | | |
|---|---|---|
| 4,149,436 A | 4/1979 | Blattler |
| 4,207,786 A | 6/1980 | Astle et al. |
| 4,411,178 A | 10/1983 | Wachs et al. |
| 4,437,366 A | 3/1984 | Astle |
| 4,483,223 A | 11/1984 | Nail et al. |
| 4,543,861 A | 10/1985 | Kwech et al. |
| 4,614,136 A | 9/1986 | Pertle |
| 4,677,884 A | 7/1987 | Kwech et al. |
| 4,739,685 A | 4/1988 | Ricci |
| 4,823,655 A | 4/1989 | VanderPol |
| 4,981,055 A | 1/1991 | VanderPol et al. |
| 5,309,620 A | 5/1994 | Shinohara et al. |

(Continued)

FOREIGN PATENT DOCUMENTS

JP 2747523 B2 12/1987

OTHER PUBLICATIONS

E. H. Wachs, SOB 412/2 Small Diameter Beveler Portable Pipe & Tube Prepping Machine, Sales Brochure, undated, 2 pages, E. H. Wachs Company, Lincolnshire, Illinois D has manual axial feed.

(Continued)

*Primary Examiner* — Sara Addisu
(74) *Attorney, Agent, or Firm* — Klintworth & Rozenblat IP LLP

(57) ABSTRACT

A device for preparing the end of a pipe includes a non-rotatable mandrel one end of which is attachable to the pipe. A motor rotates a sleeve around the mandrel and the sleeve retains an arm perpendicular to the mandrel for cutting the pipe. A cam surface on the rotating sleeve moves a cam follower. Movement of the cam follower is converted to rotational movement for turning a feed nut threaded on the mandrel. The rate at which the sleeve is advanced by the feed nut is controlled by limiting the movement of the cam follower.

6 Claims, 16 Drawing Sheets

(56) References Cited

U.S. PATENT DOCUMENTS

| | | | |
|---|---|---|---|
| 5,570,608 | A | 11/1996 | Miller |
| 5,642,969 | A | 7/1997 | Strait |
| 5,775,188 | A | 7/1998 | Strait |
| 5,894,772 | A | 4/1999 | Nodar |
| 5,954,362 | A | 9/1999 | Aota et al. |
| 6,050,161 | A | 4/2000 | Tremblay |
| 6,189,425 | B1 | 2/2001 | Ricci et al. |
| 6,202,522 | B1 | 3/2001 | Tremblay |
| 6,994,002 | B2 | 2/2006 | Moruzzi |
| 7,383,758 | B2 | 6/2008 | Place et al. |
| 7,793,574 | B2 | 9/2010 | Sorensen et al. |
| 8,250,953 | B2 | 8/2012 | Hall et al. |
| 8,616,078 | B2 | 12/2013 | Matsumoto et al. |
| 2002/0003173 | A1 | 1/2002 | Bauer et al. |
| 2003/0106397 | A1 | 6/2003 | Ricci et al. |
| 2009/0229431 | A1 | 9/2009 | Ricci et al. |
| 2012/0152521 | A1 | 6/2012 | Akkerman et al. |

OTHER PUBLICATIONS

International Search Report and Written Opinion for PCT/US2010/046006 dated Sep. 20, 2011, 16 pages.

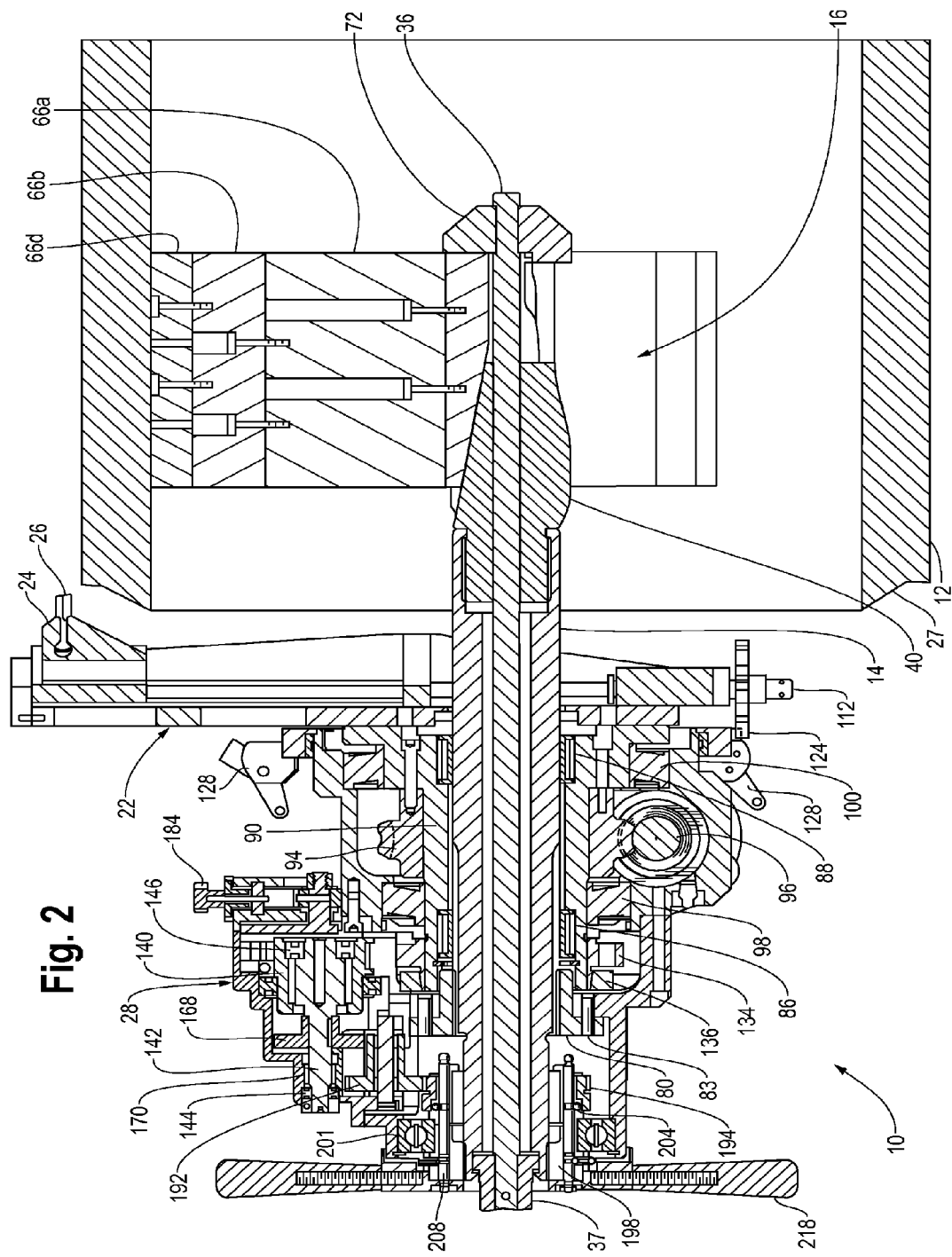

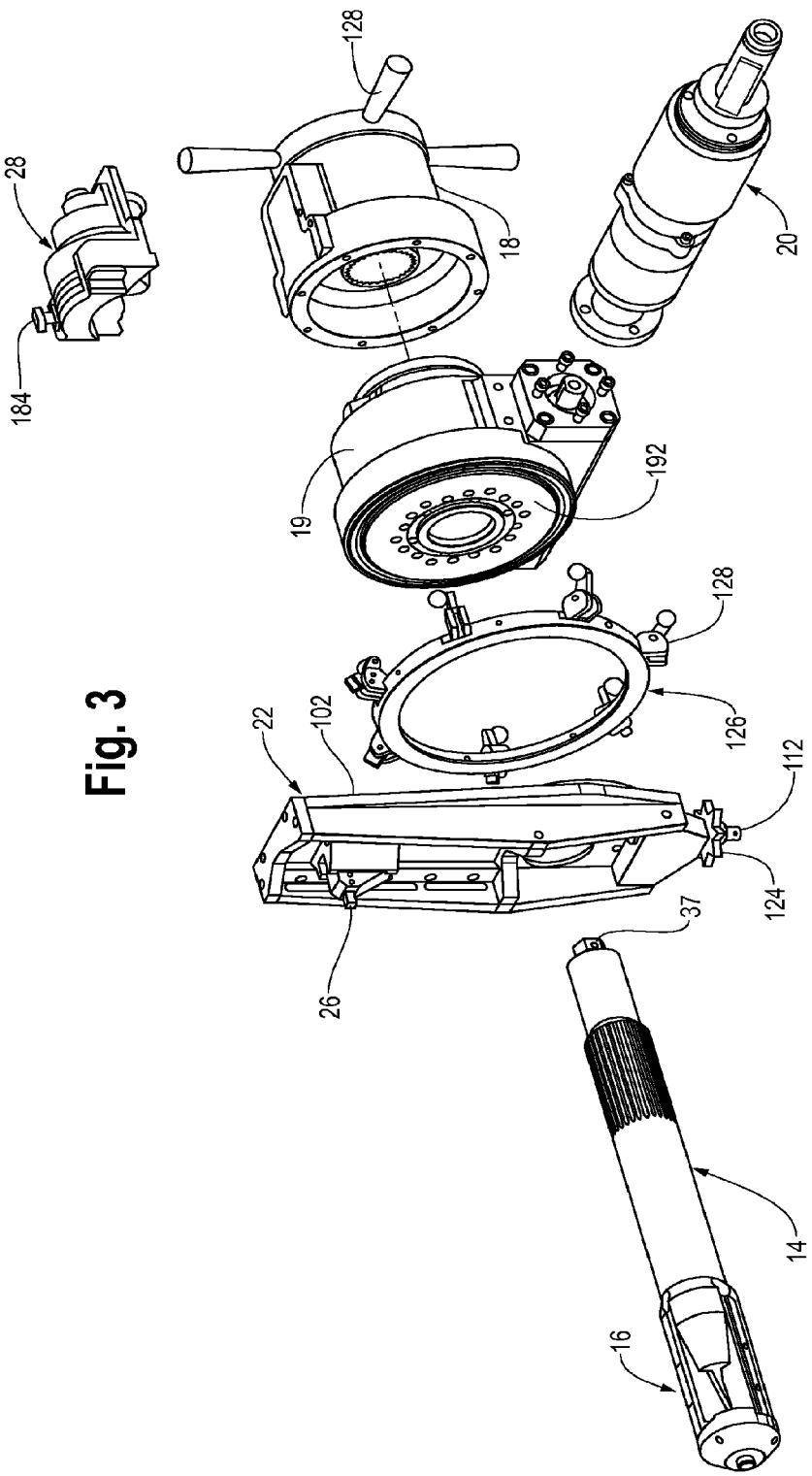

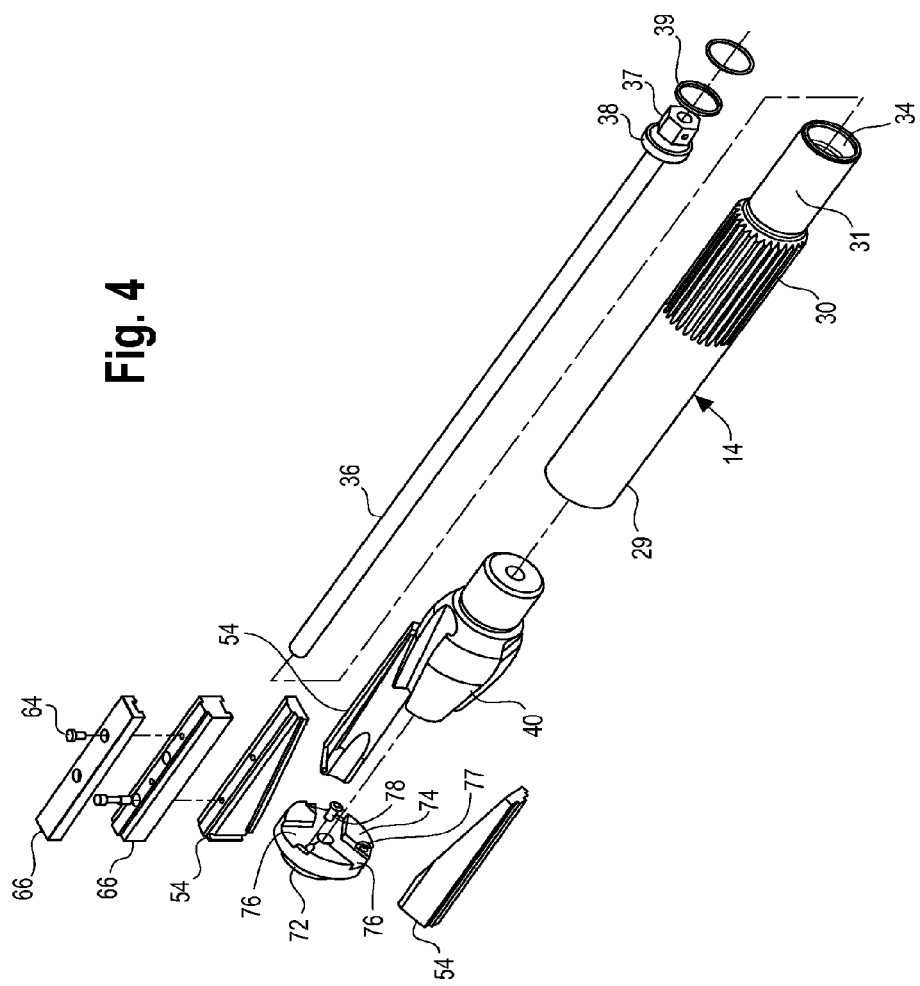

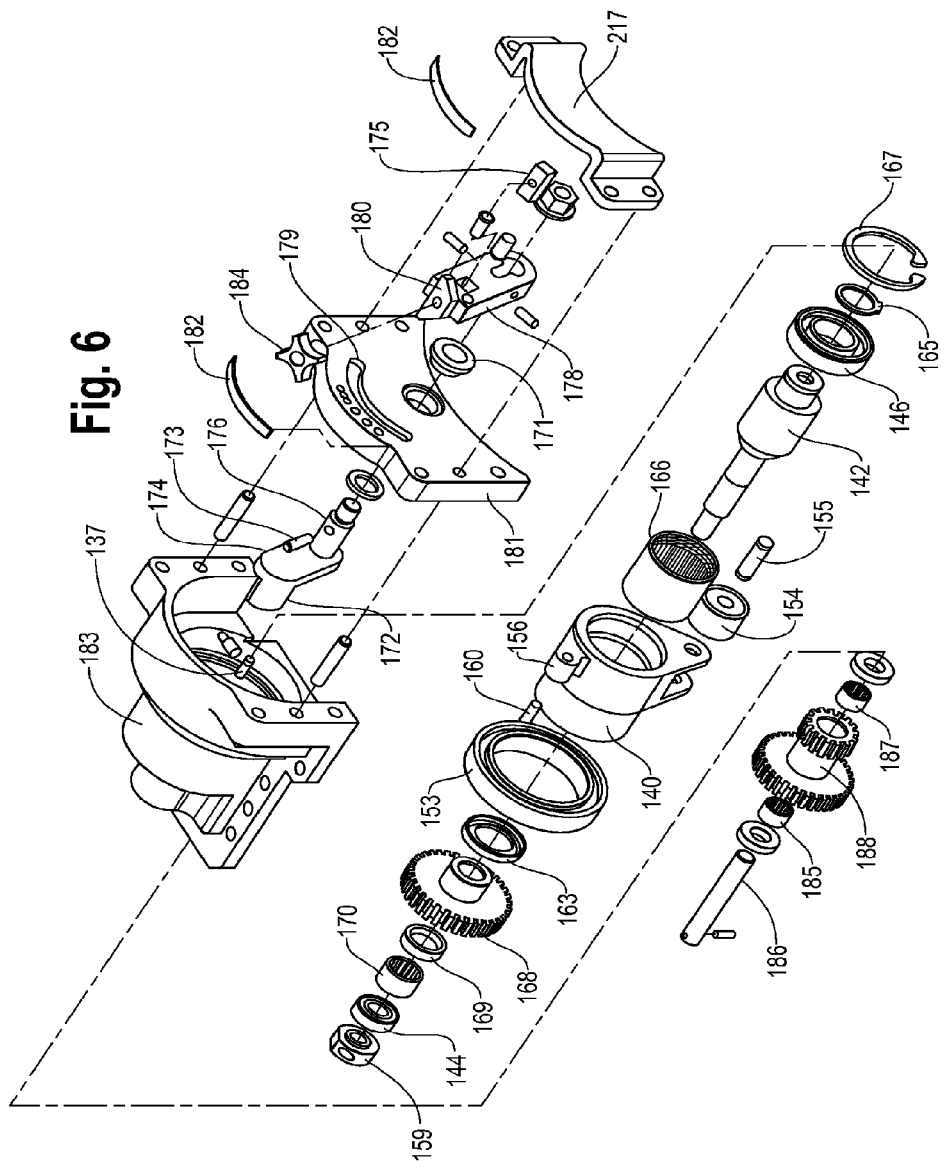

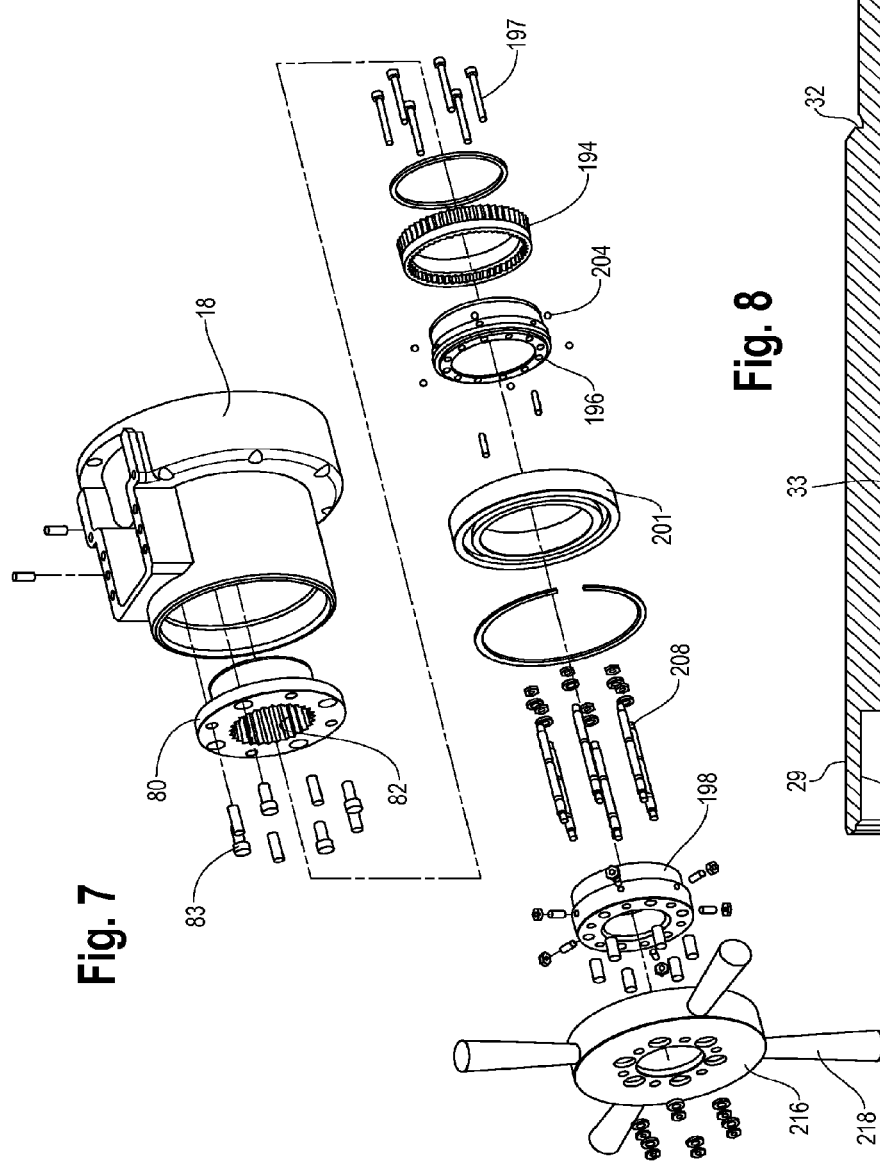

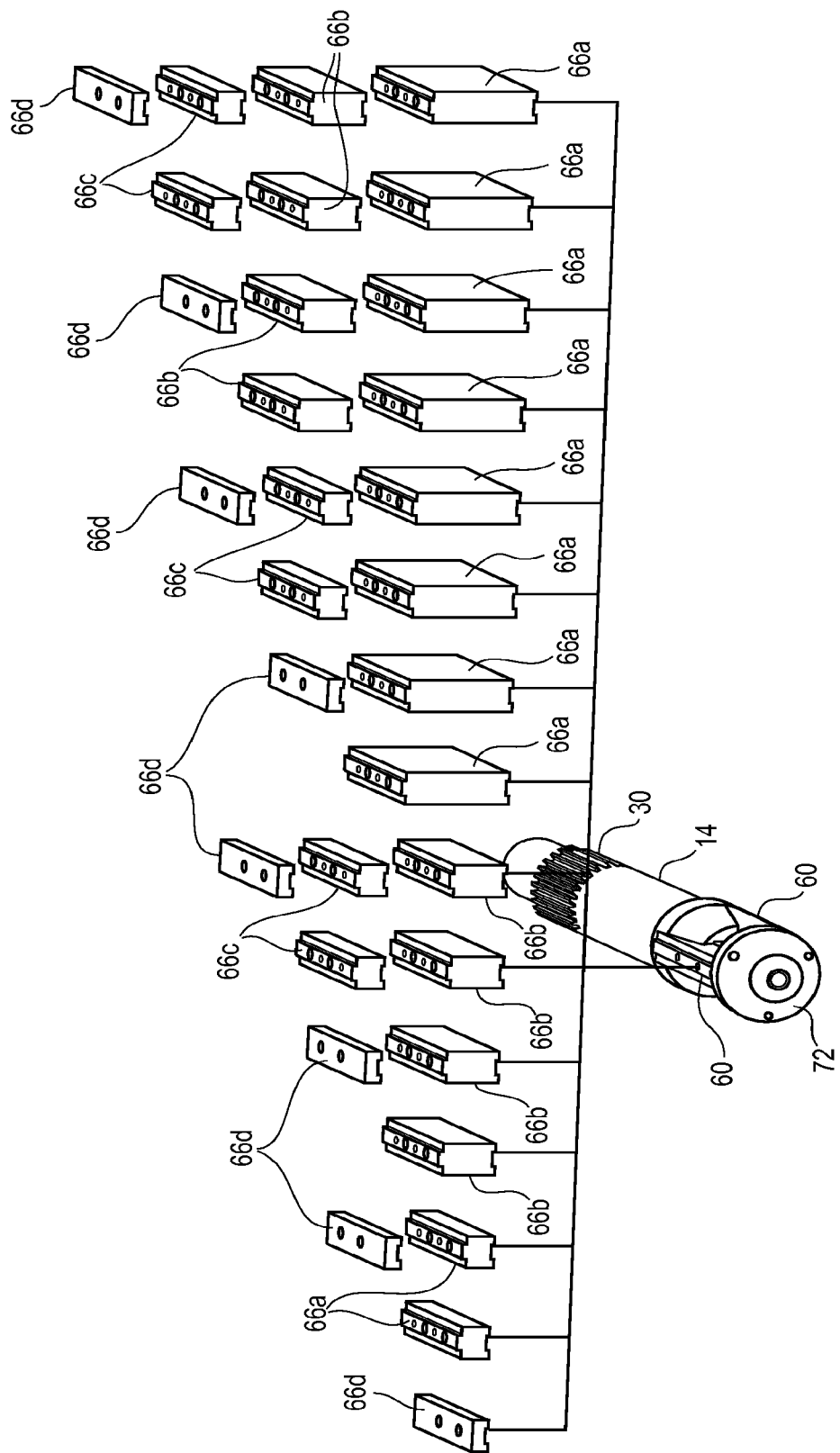

PIPE END MACHINING DEVICE WITH AXIAL AUTOFEED

The present application is a continuation of co-pending U.S. patent application Ser. No. 12/574,775, filed Oct. 7, 2009, which claims the priority benefit of U.S. Provisional Patent Application No. 61/235,768, filed Aug. 21, 2009, the contents of all of which are incorporated by reference herein in their entirety. The present invention relates to a device for machining the end of a pipe to provide a bevel suitable for welding and in particular to an autodrive for machining a compound bevel angle without requiring the reconfiguration of the machine.

BACKGROUND OF THE INVENTION

Extended piping requires that shorter lengths of pipe be welded together end to end to form a longer section and prior to joining two lengths together, the mated ends must be machined to receive a weld. Where the wall of the pipe is relatively thin, the distal end of the pipe may be machined into a simple bevel. Where the wall of the pipe is thicker, a compound bevel is required. A typical compound bevel has one portion angled at ten degrees and a second portion angled at thirty-seven degrees.

Machines that bevel the distal end of a length of pipe are elongate with a first end structured to engage the inner surface of a length of pipe and retain the machine rigid with respect to the pipe. The second end of the machine includes a rotating member with a cutting end. Some machines can be configured to automatically cut a bevel at a fixed angle, for example, cut at ten degrees. Such machines must be reconfigured if they are subsequently required to cut a second portion of a bevel at thirty-seven degrees. Other machines move the tool radially at a fixed rate and provide a manually operable feed screw for moving the tool axially. The rate at which the axial feed screw is operated determines the angle of the bevel being cut. The operator can therefore rotate the feed screw at a first rate, for example, one revolution of the screw for each revolution of the cutting tool to form a first bevel angle of thirty-seven degrees and then change the feed rate, for example, to three rotations of the feed screw for each rotation of the cutting tool to cut a bevel at ten degrees. However, the operation of such a machine requires constant attention from the operator. It may take forty-five minutes or longer for a machine to cut a bevel at the distal end of a length of pipe, and if the operator fails to properly adjust the feed screw after each revolution or sequence of revolutions of the cutting tool, the bevel will not be properly formed. It would be desirable, therefore, to provide a device for machining the end of a length of pipe that is capable of forming a compound bevel without requiring the reconfiguration of the machine or requiring that an operator manually rotate a feed screw.

SUMMARY OF THE INVENTION

Briefly, the present invention is a device for preparing the end of a length of pipe that includes an elongate non-rotatable shaft having a clamp at one end that includes a plurality of moveable shoes for applying force to the inner surface of a length of pipe to thereby retain the shaft to the pipe. A housing at the second end of the shaft retains a sleeve rotatable around the shaft and an arm extending radially from the sleeve. A motor rotates the sleeve and the arm, and the sleeve is axially moveable along the shaft.

A cutting tool suitable for cutting the pipe is radially moveable along the arm and a drive radially moves the tool as the sleeve rotates about the shaft thereby providing a linear relationship between rotation of the sleeve and radial movement of the tool.

A portion of the shaft has a threading and a feed screw rotates on the threading for axially advancing the sleeve. The rotating sleeve has an annular cam surface thereon that moves a cam follower mounted on the housing. Movement of the cam follower is converted into rotational movement that rotates a gearing connected to the feed screw for advancing the sleeve along the shaft in response to movement of the cam follower.

The device further includes a control for controlling the outer limits of movement of the cam follower thereby controlling the rate at which the gearing is rotated thereby controlling the rate of axial movement of the feed screw and axial movement of the cutting tool. Accordingly, adjustment of the control changes the limits of movement of the cam follower and changes the axial speed of the cutting tool, thereby changing the angle of the bevel being cut. By merely changing the control, the device will change the angle of the bevel being cut without requiring an operator to reconfigure the machine.

BRIEF DESCRIPTION OF THE DRAWINGS

A better understanding of the invention will be had after a reading of the following detailed description taken in conjunction with the drawings wherein:

FIG. 2 is a cross-sectional view of the device shown in FIG. 1 attached to a length of pipe;

FIG. 3 is an exploded view of the device show in FIG. 1, showing the major components thereof;

FIG. 4 is an exploded view of the mounting assembly for retaining the device shown in FIGS. 1 and 2 to the length of pipe;

FIG. 6 is an exploded view of the autofeed assembly that provides rotational power for axially moving the facing arm shown in FIG. 5;

FIG. 7 is an exploded view of the feed that axially drives the facing arm and cutting tool shown in FIG. 5;

FIG. 8 is a cross-sectional view of the mandrel shown in FIGS. 2 and 3;

FIG. 30 shows a collection of different sizes of shoes attachable to the device shown in FIGS. 1 and 2 to accommodate a range of sizes of pipe.

DETAILED DESCRIPTION OF PREFERRED EMBODIMENT

Figure 1:
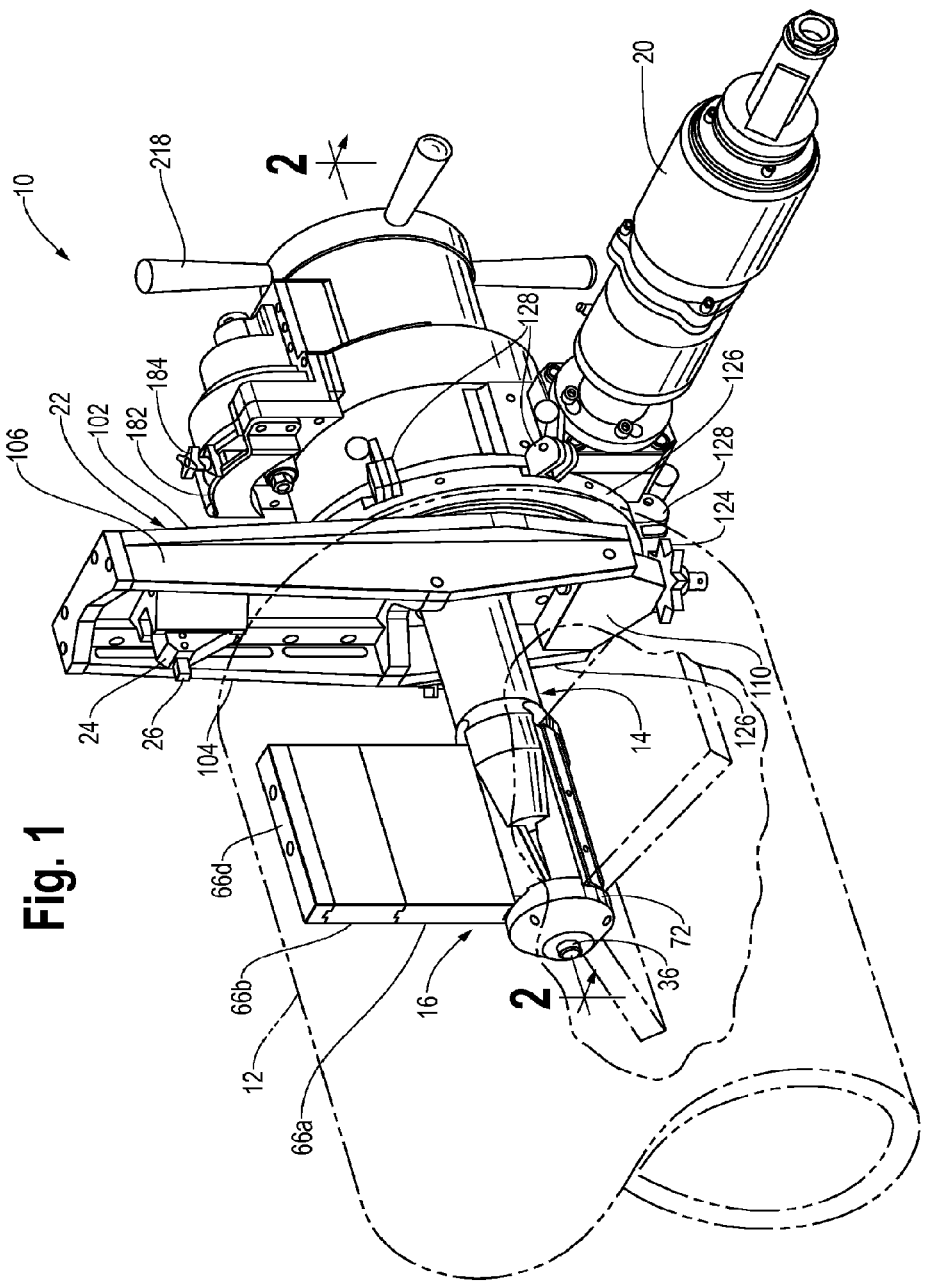
FIG. 1 is an isometric view of a device in accordance with the present invention.
Figure 1A:
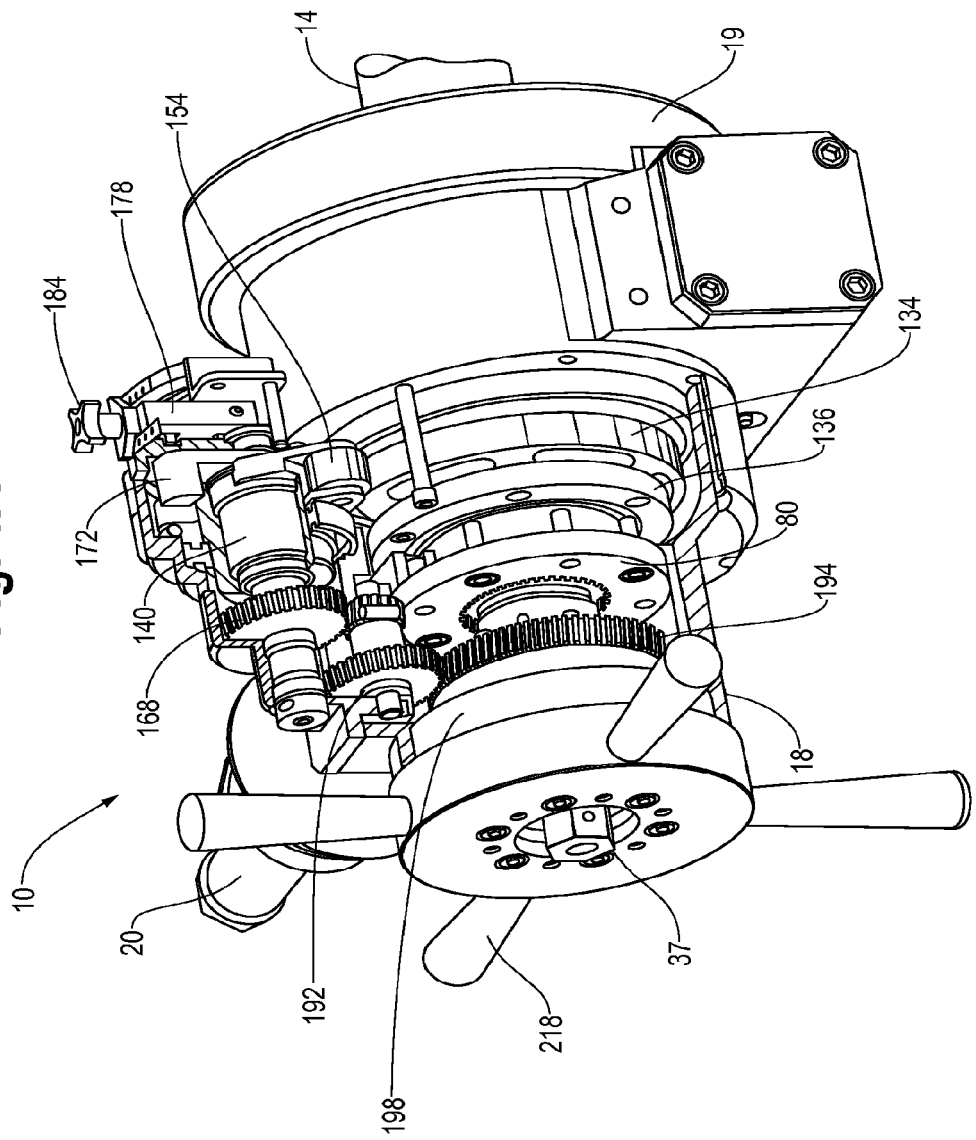
FIG. 1A is another isometric view of the device taken from the opposite side, with a portion of the housing broken away.

Referring to FIGS. 1, 2, and 3, a device 10 for machining the distal end of a length of pipe 12 has an elongate central shaft or mandrel 14 at one end of which is a mounting assembly 16 for retaining the mandrel 14 axially aligned with the longitudinal axis of the pipe 12 and at the opposite end of which are housing portions 18 and 19 that assemble together and are non-rotatable with respect to the mandrel 14. The device also includes a motor 20, a rotating arm 22, and radially moveable along the arm 22 a tool holder 24 for retaining a cutting tool 26. When in operation, the arm 22 rotates around the mandrel 14 and the cutting tool 26 is moved by the tool holder 20 and the arm 22 to cut a compound bevel 27 at the outer end of the length of pipe 12.

To cut a compound bevel 27, the device 10 includes an adjustable autofeed 28 that can adjustably fix the axial rate at which the housing 18, 19 is axially advanced with respect to the mandrel 14 thereby axially moving the arm 22 and the tool 26. For the purposes of this discussion, the mounting portion 16 will be described as being at the rearward end of the device 10 and the housing 18, 19 positioned at the forward end thereof. In similar fashion, the mandrel 14 has a rearward end retaining the mounting assembly 16 and a forward end retaining the housing 18, and all longitudinally oriented parts likewise have forward and rearward ends.

Referring to FIGS. 2, 4, and 8, the mandrel 14 is a hollow cylinder, the outer surface of which has a rearward cylindrical portion 29. Forward of the cylindrical portion 29 are centrally located splines 30, and forward of the splines 30 is a smaller diameter threaded portion 31. A radial shoulder 32 defines the intersection between the splines 30 and the forward threaded portion 31. The central opening 33 of the mandrel 14 is cylindrical. An annular shoulder 34 is spaced a short distance from the forward end of the mandrel 14 and female threads 35 extend a short distance into the rearward end thereof.

Rotatably mounted within the mandrel 14 is an elongate threaded draw bar 36 having a hex nut 37 non-rotatably mounted to the outer end thereof such that an operator can rotate the hex nut 37 and the draw bar 36 using a conventional hand wrench, not shown. An annular flange 38 at the rearward end of the nut 37, axially retains the draw bar 36 with respect to the inner surface of the mandrel 14. The rearward surface of the flange 38 abuts the annular shoulder 34 in the inner surface of the mandrel 14 and the forward surface of the flange 38 abuts an annular retainer 39 to thereby retain the draw bar 36 against axial movement with respect to the mandrel 14.

Referring to FIGS. 2, 4, 8, 9, 10, 11, 12, 13, and 30, the mounting assembly 16 at the rear end of the mandrel 14 includes a chuck body 40 that is symmetrical about its longitudinal axis and at the forward end of which is a cylindrical threaded portion 41 that is threadedly received in the female threads 35 at the rearward end of the mandrel 14. The rearward end of the chuck body 40 has a plurality of grooves 42 therein equally spaced around the circumference thereof. Each of the grooves 42 has a ramped bottom surface 44 and opposing side surfaces 46, 48, one of which 48 has an associated undercut 50 therein. An axial hole 51 extends through the length of the chuck body 40 that rotatably receives the draw bar 36.

Slideably fitted within each of the grooves 42 is a wedge-shaped chuck leg 54 having a lower surface 56 adapted to slide along the bottom surface 44 of one of the grooves 42. One of the opposing walls 52 of each of the chuck legs 54 is indented forming a ridge 58 along one side of the lower surface 56 which are slideably received within the undercut 50 of the chuck body 40. Each chuck leg 54 also has a generally planar upper surface 60 having at least two tapped holes 62 therein for receiving retaining screws 64 for retaining one or more sets of removable shoes 66. The rearward end 67 of each chuck leg 54 also has a transverse groove 69 therein thereby forming a ridge 68 along the rear face of the chuck leg 54 that is perpendicular to the upper surface 60.

The shoes 66 that are attachable to the outer surface 60 of each leg 54 are preferably available in a plurality of lengths. As depicted in FIG. 30, the shoes may be available in four distinct lengths with shoe 66A being the longest and shoe 66D being the shortest. By assembling different combinations of shoe lengths to each leg 54, the length of the legs 54 can be adjusted to retain the mandrel 14 in any diameter of pipe 12.

On the distal end of the draw bar 36 is an annular end plate 72 having a forward surface 74 with a plurality of radially directed grooves 76 therein for receiving the rearward ends 67 of each chuck leg 54 and a threaded central opening 77 that threadedly receives the distal end of the draw bar 36. Retained in mounting holes, not shown, adjacent to each of the grooves 76 are retaining screws, one of which 78 is shown. Each screw 78 has a head that engages the ridge 68 of one of the chuck legs 54, thereby slideably retaining the end of the chuck leg 54 to the end plate 72. Accordingly, rotation of the hex nut 37 at the forward end of the draw bar 36 will rotate the draw bar 36 and cause axial movement of the end plate 72. Axial movement of the end plate 72 toward the hex nut 37 will move all of the chuck legs 54 upwardly along the ramp surfaces 44 and force the removable shoes 66 to move radially outward until they engage the inner surface of the central opening of the pipe 12 thereby locking and retaining the mandrel 14 coaxial with the pipe 12. Rotation of the hex nut 34 in the opposite direction will withdraw the shoes and release the mandrel 14 from the pipe 12.

Referring to FIGS. 2 and 7, surrounding the central portion 30 of the mandrel 14 is an annular coupling 80 having female splines 82 for slideably engaging the splines 30 of the mandrel 14. A plurality of screws 83 extend through holes, unnumbered, in the coupling 80 and into a retaining flange that forms part of the housing 18 to retain the housing 18 against rotation with respect to the mandrel 14 and allow the housing 18 to move axially with respect to the mandrel 14.

Figure 14:
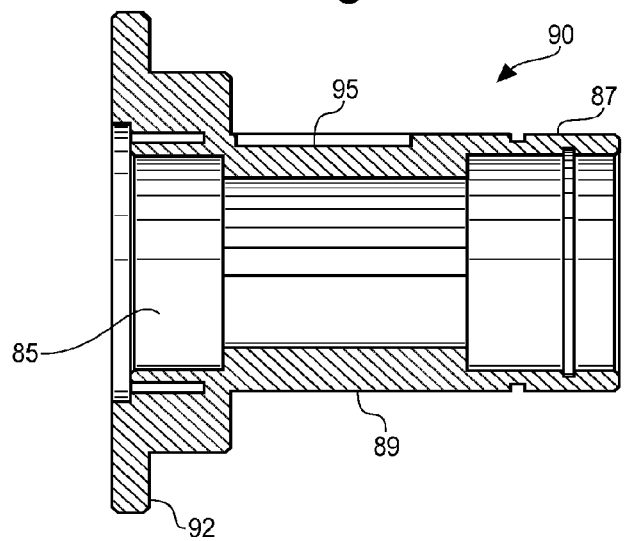
FIG. 14 is a cross-sectional view of the main shaft shown in FIG. 2.

Referring to FIGS. 2 and 14, rotatably mounted on bearings 86, 88 around the cylindrical portion 29 of the mandrel 14 immediately rearward of the splines 30 is a main shaft 90. The main shaft 90 is generally tubular in shape having a cylindrical inner opening 85 through with the mandrel 14 extends such that the main shaft 90 forms a sleeve rotatable around the mandrel 14. The forward end of the main shaft 90 has male threads 87, and rearward of the male threads 87 is a centrally located cylindrical section 89. At the rearward end of the main shaft 90 is a radial flange 92. A worm gear 94 is fitted around the central cylindrical section 89 and the worm gear 94 is driven by a worm shaft 96 mounted on a shaft from the motor 20. The worm gear 94 is retained with respect to the main shaft 90 by a key, not visible, in a key slot. Another set of bearings 98, 100 rotatably maintain the main shaft 90 with respect to the housing 18.

Referring to FIGS. 1, 2, 3, and 5 the rotating arm 22 includes a mounting plate 102 retained by a plurality of bolts, not visible, to the rearward surface of the flange 92 of the main shaft 90 for rotation therewith. On opposite sides of the rearward surface of the mounting plate 102 are stiffener plates 104, 106 for rigidly retaining the mounting plate 102. At the radially outward end of the mounting plate 102 and stiffeners 104, 106 is an end plate 108. At the opposite end of the plate 102 is a feed screw block 110 having a transverse hole 111 therein through which an elongate threaded feed screw 112 extends.

The stiffener plates 104, 106 are oriented parallel to one another along the mounting plate 102 and form a channel along which a rectangular shaped male slide 114 is slideable. The slide 114 has a transverse threaded hole 116 therein for threadedly receiving the outer end of the feed screw 112. An enlarged diameter portion 122 of the feed screw 112 forms a thrust shoulder for applying force against a surface of the feed screw block 110 when the slide 114 it is moved radially outward. The distal end of the feed screw 112 has a star wheel 124 non-rotatably retained thereto such that rotation of the star wheel 124 rotates the feed screw 112 and causes radial movement of the slide 114. Mounted on the slide 114 is the tool holder 24 and cutting tool 26.

Figure 5:
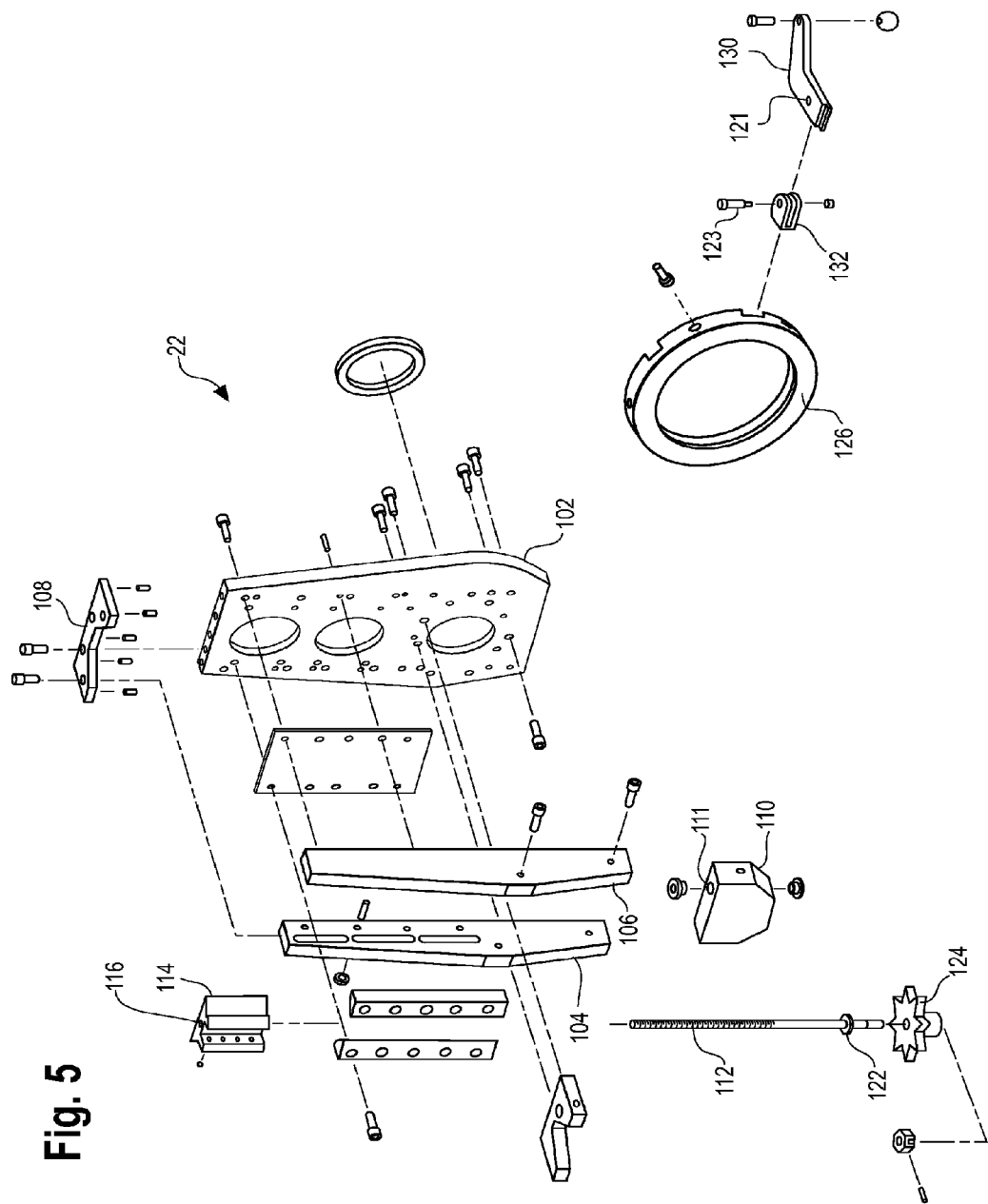
FIG. 5 is an exploded view of the facing arm of the device shown FIGS. 1 and 2 that engages and cuts the distal end of a length of pipe.
Figure 11:
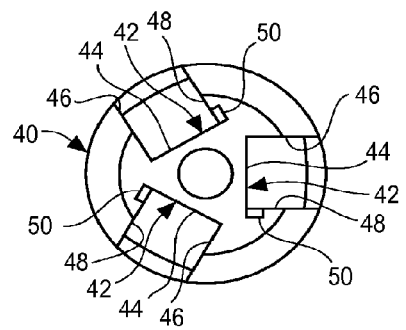
FIG. 11 is a rear end view of the chuck shown in FIG. 9.
Figure 9:
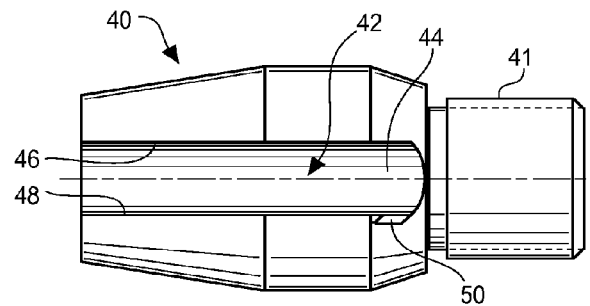
FIG. 9 is a side elevational view of the chuck shown in FIG. 4.
Figure 10:
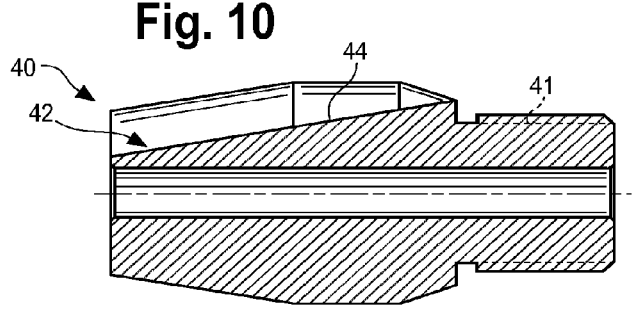
FIG. 10 is a cross-sectional view of the chuck shown in FIG. 9.
Figure 12:
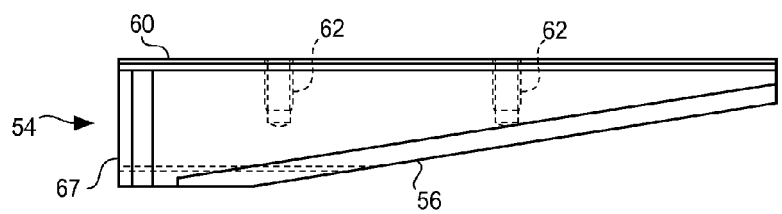
FIG. 12 is a side elevational view of one of the chuck legs shown in FIG. 4.
Figure 13:
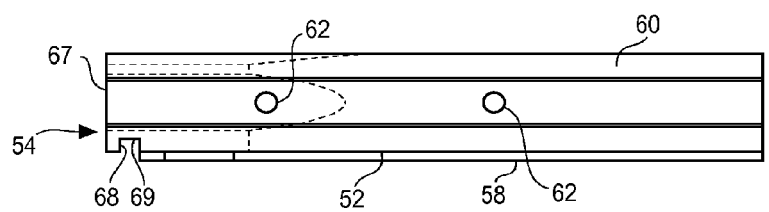
FIG. 13 is an elevational view of the outer end of the chuck leg shown in FIG. 12.

As best shown in FIGS. 2, 3, and 5, mounted around the circumference of housing member 19 and adjacent the mounting plate 102 is an annular trip retainer 126. Positioned at equally spaced locations around the circumference of the trip retainer 126 are a plurality of moveable trips 128. Each trip 128 consists of an elongate arm 130 with a handle at one end thereof and a centrally located transverse hole 121. Each trip 128 is mounted in a U-shaped retainer 132 on a pin 123 that extends through the centrally located transverse hole 121 of the moveable trip and through aligned holes in each of the parallel sides of the U-shaped trip retainer 132. Using the handles of the various trips 128, an operator can position the various trips 128 into an engagement position, in which the trip is extended, or a non-engaging position, in which the trip is not extended, for engaging or not engaging the points of the star wheel 124 as the mounting plate 102 rotates around the mandrel 14. Accordingly, by setting or not setting the desired number of trips 128, an operator can determine the rate at which the star wheel 124 is rotated with respect to a single rotation of the mounting plate 104 and the tool 26 about the mandrel 14, and thereby controlling the speed of radial movement of the tool 26 with respect to the rotation of the mounting plate 102.

Figure 15:
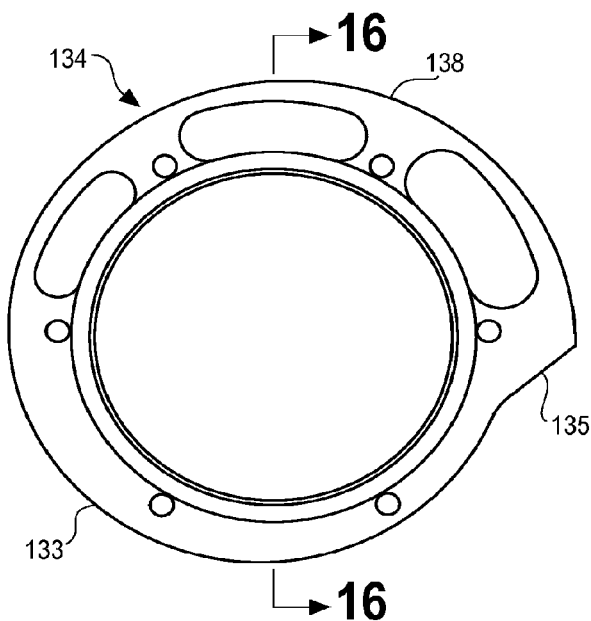
FIG. 15 is an end view of a locking nut and carp shown in FIG. 2.
Figure 16:
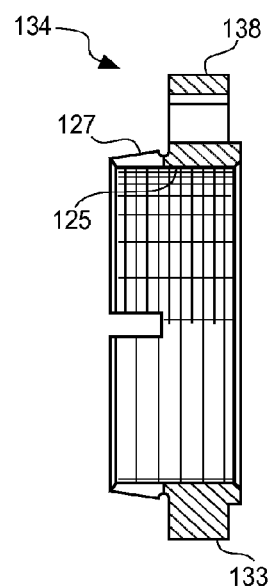
FIG. 16 is a cross-sectional view of the locking nut and cam shown in FIG. 15 taken through line 16-16 thereof.
Figure 17:
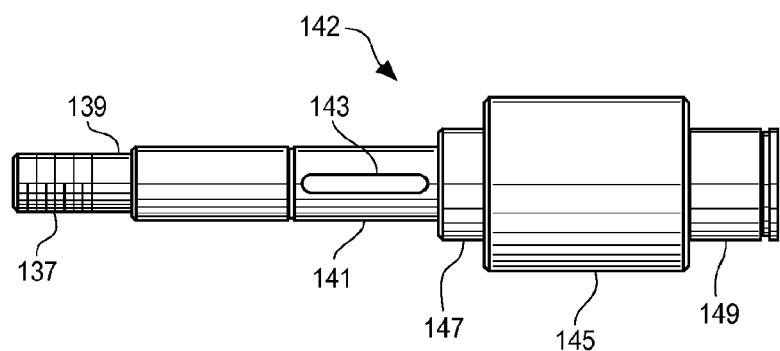
FIG. 17 is a side elevational view of the cam follower shaft shown in FIG. 6.
Figure 18:
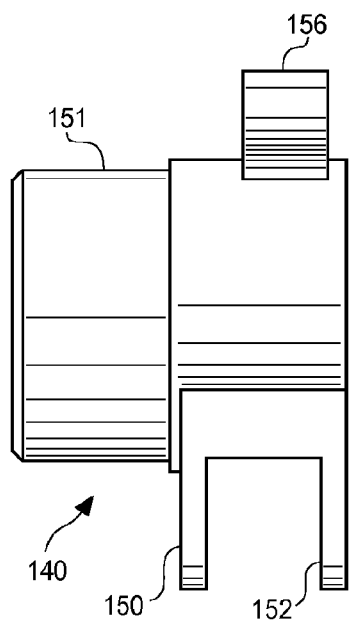
FIG. 18 is a side elevational view of the cam follower shown in FIG. 6.
Figure 19:
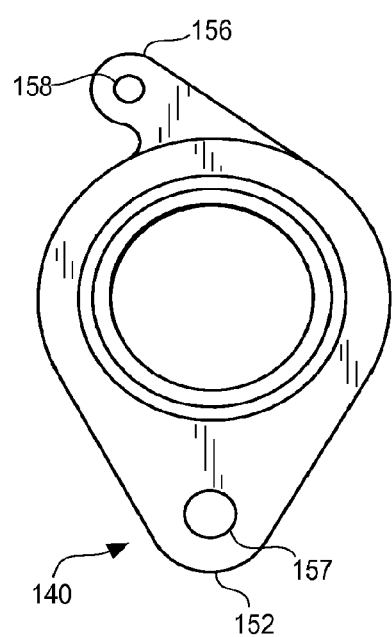
FIG. 19 is an end view of the cam follower shown in FIG. 18.
Figure 20:
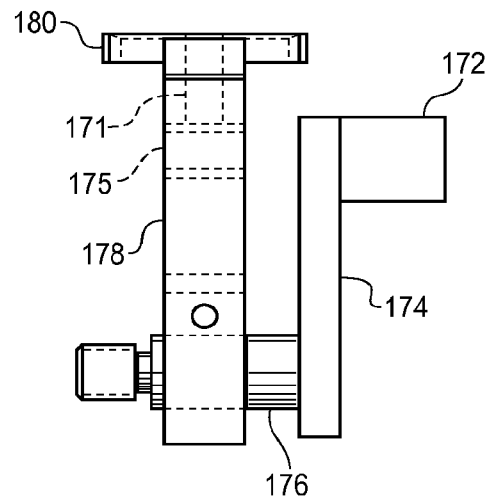
FIG. 20 is a side elevational view of the stop, the stop shaft, and the stop adjusting arm assembled together and visible in FIG. 2.
Figure 21:
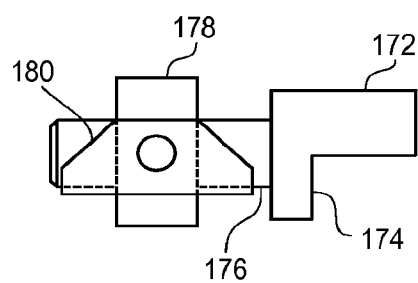
FIG. 21 is an end view of the stop, the stop shaft, and the stop adjusting arm as shown in FIG. 20.

Referring to FIGS. 1A, 2, 15, and 16, a locking nut 134 has female threads 125 extending into the rearward end thereof that threadedly receive the threads 87 of the main shaft 90 and has a forward surface that abuts against the bearing 98, thereby retaining the bearings 98, 100 with respect to the main shaft 90. The forward end 127 of the outer surface of the locking nut 134 is frustoconical and the locking nut 134 is locked to the threads 87 of the main shaft 90 by an annular locking member 136 having an inner surface complementary to the frustoconical surface 127 of the lock nut 134 to ensure that the bearing lock nut and main shaft 90 rotate together. As best shown in FIG. 15, the rearward end of the outer surface 138 of the threaded locking nut 134 forms a cam against which moves a follower as is further described below. The cam 138 includes a gradual ramp portion 133 along which the radius is gradually lengthened and rapid fall section 135 extending between the maximum radius and minimum radius of the gradual ramp portion 133.

Referring to FIGS. 1A, 2, 6, and 17 through 19, a fundamental element of the present invention is the provision of the adjustable autofeed 28 for moving the housing 18 along the mandrel 14 at a rate that can be changed without reconfiguring the machine to thereby form a compound bevel 27. The heart of the adjustable autofeed 28 lies in a cam follower 140 mounted on a shaft 142. The shaft 142 has a threaded forward end 137. Rearward of the threaded forward end 137 is a first cylindrical portion 139, and rearward of the first cylindrical portion 139 is a second, larger diameter cylindrical portion 141. Along the rearward half of the second cylindrical portion 141 is a key slot 143. Rearward of the key slot 143 in cylindrical portion 141 is a large diameter cylindrical portion 145 having somewhat smaller diameter side portions 147, 149. At the rearward end of the cam shaft 142 is an annular groove for receiving a snap ring, unnumbered. The camshaft 142 extends parallel to the mandrel 14 with the forward end retained by a bearing 144 in the housing 18. The cam follower 140 has a tubular body with a generally cylindrical outer surface. The forward portion 151 of the outer surface is an uninterrupted cylinder so as to receive bearing 153 that rotatably retains the cam follower 140 in a portion of the housing 18. The rearward portion of the cam follower 140 has a pair of spaced apart parallel ears 150, 152 with aligned transverse holes 157 therein and fitted between the ears 150, 152 and rotatable on a shaft 155 extending through the holes 157 in the ears 150, 152 is a rotatable roller 154 positioned to engage the outer surface of the cam 138. The cam follower 140 further has a third ear 156 positioned approximately diametrically opposite the first and second ears 150, 152. The third ear 156 has a threaded hole 158 therein for receiving a pin 160.

The cam follower 140 is fitted around the large diameter portion 145 near the rearward end of the cam shaft 142, and between the enlarged diameter portion 145 and the body of the cam follower 140 is a one-way clutch 166. Forward of the one-way clutch 166, and mounted on the second cylindrical portion 141 of the cam shaft 142 is a gear 168 retained by a key, not visible, in the key slot 143 for rotation with the cam shaft 142. Forward of the gear 168 is a second one-way clutch 170 configured as a backstop. The forward end of the cam shaft 142 extends through a hole, not visible, in a portion 183 of the housing and is non-rotatably retained thereto by a collar 159 on the threaded end 137 thereof. Seals 169, 163 retain lubricants and retaining rings 165, 167 retain the parts around the cam shaft 142. The pin 160 in ear 156 receives one end of a coil spring 161, the opposite end of which connects to a pin 137 on an inner surface of the housing 18, not shown, to urge the cam follower 140 to rotate the roller 154 against the surface of the cam 138. A third bearing 146 rotatably retains the rearward end of the cam shaft 142 with respect to the cam follower 140. Accordingly, movement of the cam follower 140 and roller 154 against the outer surface of the cam 138 causes angular rotation of the cam follower 140 on the shaft 142. The first one-way clutch 166 applies an incremental angular rotation to the shaft 142 in one direction with each rotation of the cam 138 and reversal of the cam shaft 142 is prevented by the second one-way clutch 170.

Referring to FIGS. 1, 2, 6, 20, 21, and 29, an important feature of the autodrive 28 is the provision of an adjustable stop 172 that limits movement of the cam follower 140. The adjustable stop 172 is mounted on a pivot arm 174 that is rotatable on a shaft 176 oriented coaxial with the rearward end of the cam shaft 142. The stop 172 is adapted to abut the third ear 156 of the cam follower 140 and thereby limit the return of the roller 154 to contact the smallest radius portion of the cam 138. The shaft 176 extends through a housing and plate 181 and is rotated by a controlling arm 178 attached by a pin 173 to the shaft 176. A bushing 171 around the shaft 176 facilitates its rotation. At the outer end of the controlling arm 178 is a marker 180 that is moveable along a scale 182. The scale 182 is affixed to the outer surface of the end plate 181 that fits against a portion of housing 183 enclosing the autofeed 28. An end cap 217 encloses the controlling arm 178. The marker 180 and the scale 182 are visible by an operator and the controlling arm 178 is locked into a desired orientation, as shown by the marker 180 and scale 182, by a locking knob 184. The locking knob 184 threadedly receives the end of a threaded stud 173 that extends slideably through a longitudinal hole 171 in the upper end of the controlling arm 178. The lower end of the longitudinal hole 171 opens into a rectangular opening 177 that extends transversely through the controlling arm 178. Loosely fitted into the rectangular opening 177 is an elongate locking plate 175 to which the second end of the threaded stud 173 is attached. One end of the locking plate 175 extends into an arcuate slot 179 in the end plate 181 that mates against housing portion 183. Turning the locking knob 184 in one direction draws the locking plate 175 against a surface forming arcuate slot 179 in the end plate 181 thereby locking the stop 172 in a desired position. By adjusting the controlling arm 178 an operator can control the range of movement of the cam follower 140 and thereby control the relationship between the rate of rotation of the cam follower shaft 142 with respect to the rotational rate of the main shaft 90.

Figure 22:
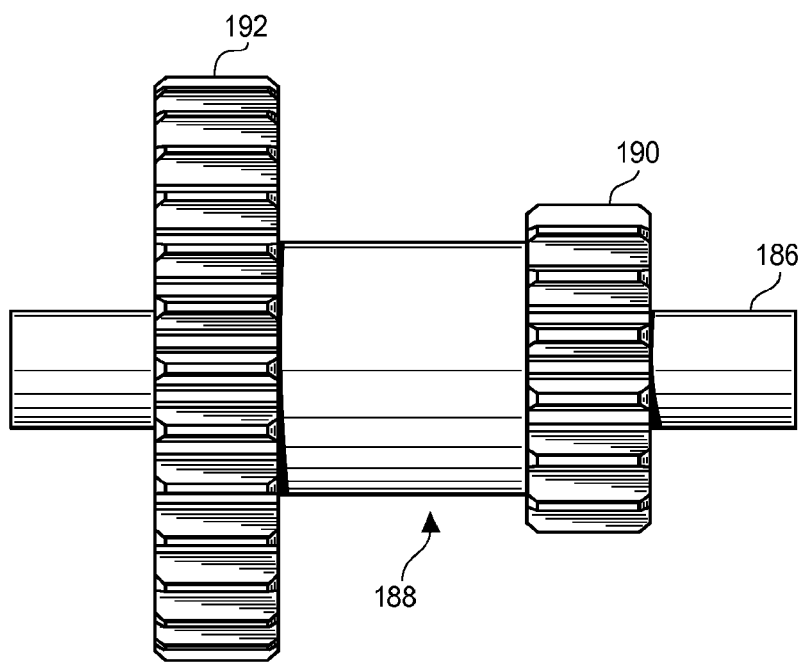
FIG. 22 is a side elevational view of the intermediary gears and shaft shown in FIGS. 2 and 29.
Figure 23:
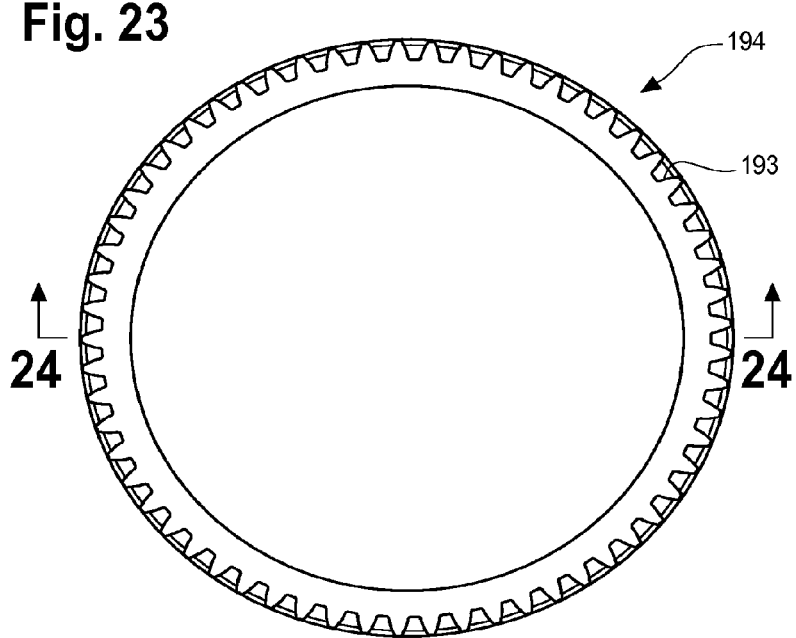
FIG. 23 is a rear end view of the feed nut drive gear shown in FIG. 7.
Figure 24:
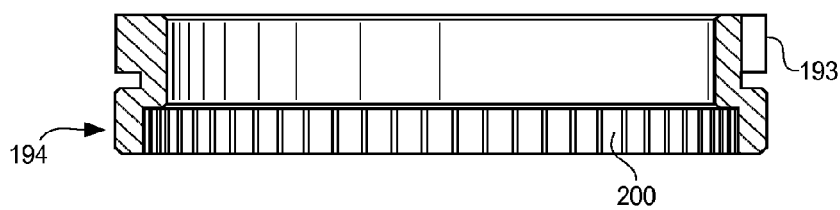
FIG. 24 is a cross-sectional view of the feed nut drive gear shown in FIG. 23 taken through line 24-24 thereof.
Figure 25:
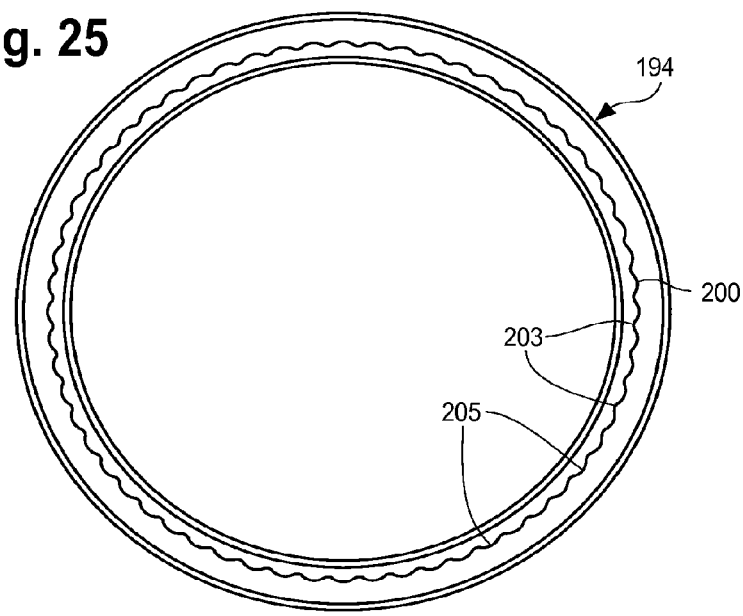
FIG. 25 is a front end view of the feed nut drive gear shown in FIG. 23.
Figure 26:
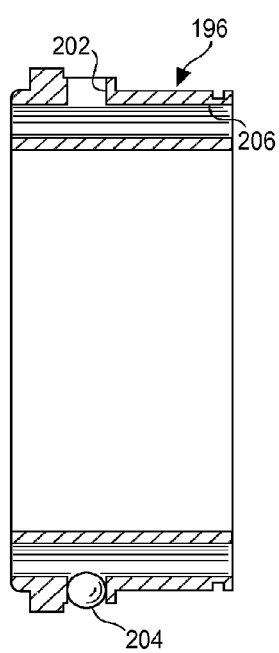
FIG. 26 is a cross-sectional view of the feed nut adapter shown in FIG. 7.

As best shown in FIGS. 2, 6, and 22, extending parallel to the mandrel 14 and the cam follower shaft 142 is yet another shaft 186. Rotatably mounted on shaft 186 on bearings 185, 187 is an intermediary gear assembly 188. The intermediary gear assembly 188 includes a second gear 190 that engages the cam shaft gear 168 and a third gear 192 that is locked for rotation with the second gear 190.

Referring to FIGS. 2, 7, and 22 through 28, the teeth of the third gear 192 engage the teeth 193 of a feed nut drive gear 194. The feed nut drive gear 194 has a large diameter central opening into which is fitted a tubular feed nut adapter 196. The feed nut adapter 196 is in turn retained by bolts 197 to a threaded feed nut 198 having internal threads 199 that engage the threaded forward end 31 of the mandrel 14. The assembled parts are rotatably retained with respect to the housing 18 by a bearing 201.

Figure 27:
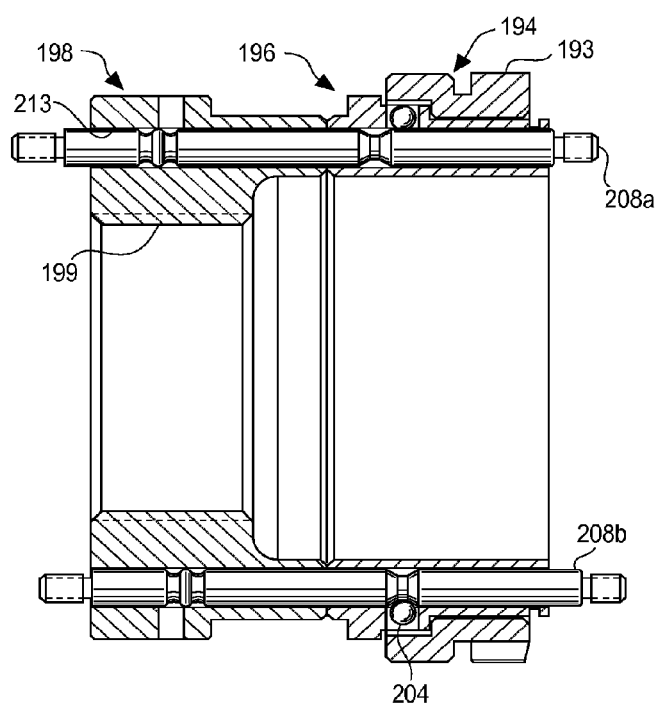
FIG. 27 is a cross-sectional view of the feed nut drive gear assembled to the feed nut adapter shown in FIG. 26 and the feed nut shown in FIG. 23 with two shifter pins inserted into the assembled parts.
Figure 28:
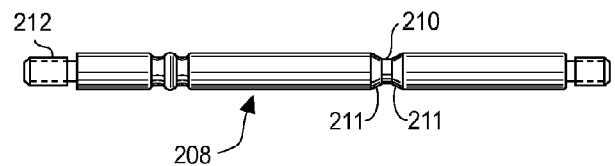
FIG. 28 is a side elevational view of a shifter pin shown in FIGS. 7 and 27.
Figure 29:
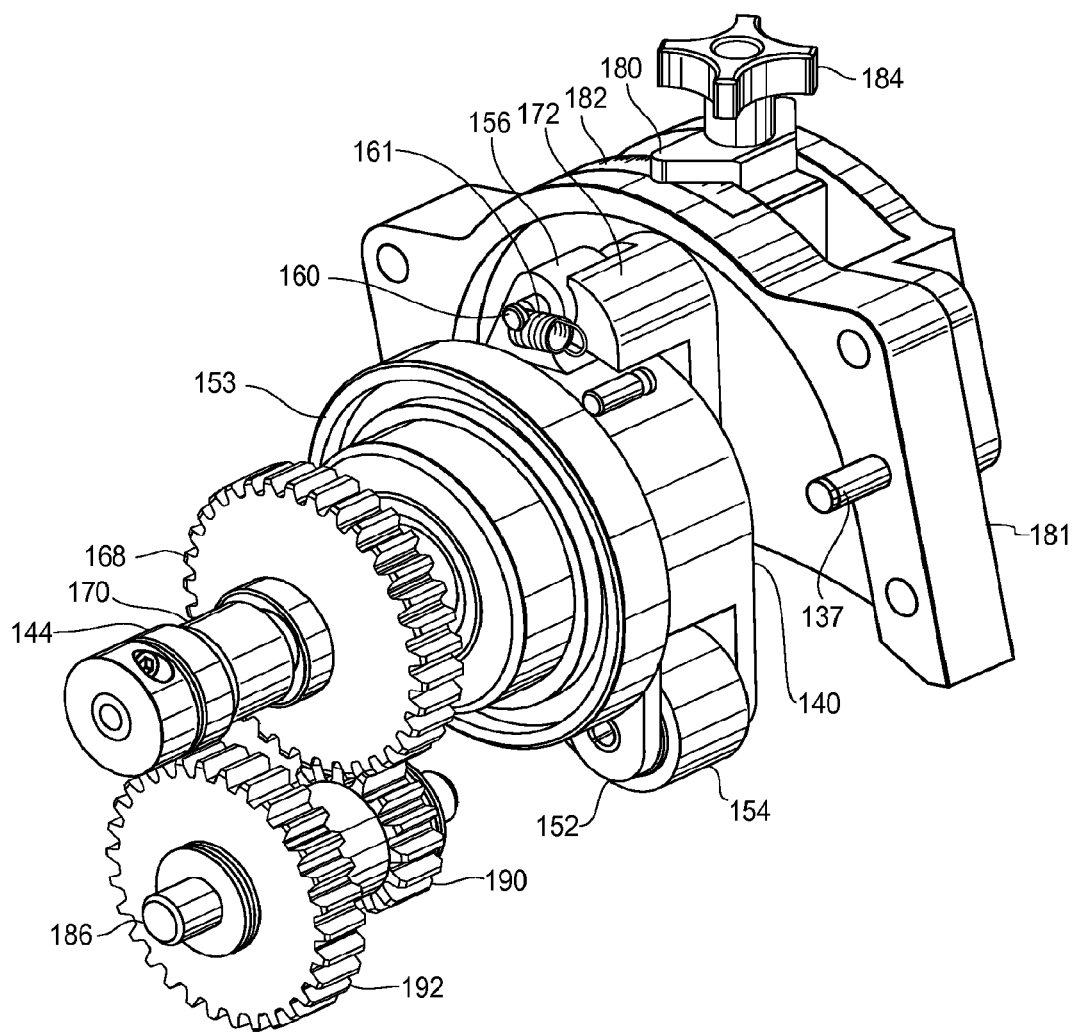
FIG. 29 is an isometric view of the cam follower, the stop, the scale for adjusting the stop, and the intermediary gears driven by the cam follower shaft.

The forward half of the inner opening of the feed nut drive gear 194 includes an annular rippled or serrated surface 200. The surface 200 has equally spaced apart crests 203 shaped as blunted teeth of a gear, and between each pair of crests 203, is a shallow, arcuate valley 205. The feed nut adapter 196 has a plurality of radial holes 202 therein that are aligned radially inward of the serrated surface 200 of the drive gear 194. Slideably fitted into each of the holes 202 is a detent ball 204. Extending parallel to the axis of the feed nut adapter 196 so as to intercept each of the radial holes 202 are transverse holes 206 each of which slideably receives an elongate shifter pin 208. Centrally located along the length of each of the shifter pins 208 is an annular groove 210 having angled side surfaces 211, and at the forward end of each shifter pin 208 is a threading 212. Each of the shifter pins 208 extends through corresponding aligned holes 213 in the feed nut 198 with the threaded ends 212 received in complementary threaded holes, unnumbered, in an end plate 216 having a plurality of radially extending handles 218. The end plate 216 and the shifter pins 208 are therefore axially moveable with respect to the mandrel 14, the feed nut drive gear 194 and the feed nut adapter 196. FIG. 2 depicts the end plate 216 compressed against the forward surface of the feed nut 198. When the end plate 26 is in this position, the shifter pins 208 are moved to their rearward position. In FIG. 27, shifter pin 208B is depicted as being in the rearward positron in which the annular groove 210 around the circumference of each of the shifter pins 208 is aligned under its associated detent ball 204 allowing the ball the sink deep within its associated radial hole 202 and not forced into the serrated surface 200 of the drive gear 194. The drive gear 194 is thereby allowed to freely rotate around the mandrel 14. On the other hand, when an operator manually pulls the end plate 116 away from the forward surface of the feed screw 198, the annular grooves 210 of the shifter pins 208 are moved away from the associated detent balls 204 as is shifter pin 208A in FIG. 7. The balls 204 are then forced up the angled surfaces 211 of the shifter pins 208 so that they engage the serrated surface 200 of the drive gear 194 and are forced into a valley 205 between two crests 203 thereby drivingly connecting the drive gear 194 to the feed nut 198. When the drive gear 194 is drivingly connected to the feed nut 198, rotational movement of the cam follower shaft 142 is applied through the various gears 168, 190, 192, 194 to rotate the feed nut 198 with respect to the mandrel 14 thereby causing axial feed of the housing 18 with respect to the mandrel 14. The autofeed 28 is therefore engaged when the end plate 216 is pulled away from the housing 18 and disengaged when the end plate 216 is compressed against the forward surface of the housing 18. With the autodrive 28 in the disengaged orientation, that is with the end plate 216 compressed against the housing, as shown in FIG. 2, an operator can manually rotate the handles 218 of the end plate 216 to provide a manual axial feed along the mandrel 14.

The angular movement of the cam follower 140 causes rotation of the cam shaft 142 and the feed nut 198. The stop 172 limits the angular rotation undertaken by the cam follower 140 with each rotation of the cam 138 and therefore, changing the position of the stop 172 changes the distance the main shaft 90 and tool 26 are advanced with each rotation of the arm 22. The scale 182 has markings 220 thereon indicative of the axial speed at which the main shaft 90 and tool 26 will be advanced. By loosening the locking knob 184, the operator can move the marker 180 to a position on the scale 182 indicative of a desired axial feed rate.

It should be apparent that the angle of a cut made by the tool 26 is determined by the combination of the rate of radial movement of the slide 114 along the arms 22 and the rate of axial movement of the main shaft 90 along the mandrel 14. The radial movement of the slide is caused by rotation of the star wheel 124, which is incrementally rotated each time the star wheel 124 engages a trip 128 that is in the engagement position. If two trips 128 are set in the engagement position, the slide 114 and tool 26 will move at twice the radial rate relative to the axial movement of the main shaft 90 as when only one trip 128 is set. One scale 184 is provided that has a marking that sets forth the angle to be cut by the tool 26 for various positions of the controlling arm 178 and marker 180 where one trip 128 is set in the engagement position. However, a second scale 184 is needed for setting the angle of the cut where two trips 128 are set, and a third scale 184 is needed for setting the angle of the cut when three trips 128 are set. As shown in FIG. 6, the housing 183 may receive two or more scales 184 with each scale 184 showing angles to be cut for a different number of trips 128 set.

To operate the device of the present invention an operator will select the desired combination of removable shoes 66 to fit the size pipe to be machined and attach them by bolts to the outer ends of each of the slides 114. The retaining end of the mandrel 14 is then extended into the length of pipe 12 and the hex head 37 rotated with a wrench until the device 10 is firmly retained with respect to the pipe 12. Thereafter, the desired number of trips 128 are set to fix the desired radial rate of movement of the cutting tool 26. The locking nut 184 is loosened allowing movement of the controlling arm 178 and marker 180 with respect to the scale 182 to set the desired feed rate after which the locking knob 184 is tightened. The motor 20 is then energized causing rotation of the mounting plate 102 around the mandrel 14. Using the handles 218 of the end plate 216 the operator can withdraw the end plate 216 to engage the autodrive 30 and cause the tool 26 to cut the desired bevel 27 at the end of the pipe 12.

While the present invention has been described with respect to a single embodiment, it will be appreciated that many modifications and variations may be made without departing from the spirit and scope of the invention. It is therefore the intent of the appended claims to cover all such modifications and variations which fall within the spirit and scope of the invention.

What is claimed:

1. A device for cutting a compound bevel at an end of a length of pipe, said device comprising
   an elongate mandrel,
   a sleeve rotatable mounted on said mandrel, a radially extending arm on said sleeve,
   a cutting tool on said arm for machining said end of length of pipe as said arm rotates,
   a motor for rotating said sleeve and said arm,
   a first gearing for radially moving said cutting tool along said arm at a fixed rate relative to rotation of said sleeve about said mandrel,
   said sleeve axially moveable along said mandrel, a threading on said mandrel,
   a feed nut engaging said threading for axially advancing said sleeve along said mandrel,
   a cam on said sleeve,
   a cam follower rotatable about a shaft,
   an adjustable stop for limiting an angle of rotation of said cam follower about said shaft, and
   a second gearing between said shaft and said feed nut wherein an axial feed rate along said mandrel is adjustable for cutting said compound bevel.

2. The device of claim 1 wherein said first gearing compresses
   a rotatable feed shaft along said arm, and
   a star wheel rotating said feed shaft in response to rotation of said sleeve about said shaft.

3. The device of claim 2 and further comprising,
   a threading on said feed shaft,
   a non-rotatable follower nut on said feed shaft, and
   said follower nut attached to said cutting tool, wherein said cutting tool is radially moved in response to rotation of said arm about said shaft.

4. The device of claim 1 and further comprising
   a marker moveable with said stop, and
   a scale having markings thereon indicative of corresponding axial feed rates wherein the positioning of said marker at a chosen feed rate on said scale will result in said sleeve and said cutting tool being advanced at said chosen rate.

5. The device of claim 1 and further comprising a manual clutch between said shaft and said feed screw.

6. The device of claim 1 and further comprising
   removable shoes attachable to said radially moveable legs, and
   said removable shoes available in a plurality of different lengths, and
   said shoes longitudinally stackable wherein a plurality of sizes of said shoes can be combined for engaging said clamp to a number of sizes of pipe diameter.

* * * * *